(12) United States Patent
Pedersen

(10) Patent No.: US 8,353,523 B2
(45) Date of Patent: Jan. 15, 2013

(54) TELESCOPIC VEHICLE AND METHOD FOR TRANSPORTING A LONG OBJECT

(75) Inventor: Gunnar K. Storgaard Pedersen, Skjern (DK)

(73) Assignee: Vestas Wind Systems A/S, Aarhus N (DK)

(*) Notice: Subject to any disclaimer, the term of this patent is extended or adjusted under 35 U.S.C. 154(b) by 0 days.

(21) Appl. No.: 13/120,209

(22) PCT Filed: Sep. 23, 2009

(86) PCT No.: PCT/EP2009/062304
§ 371 (c)(1),
(2), (4) Date: Mar. 25, 2011

(87) PCT Pub. No.: WO2010/034732
PCT Pub. Date: Apr. 1, 2010

(65) Prior Publication Data
US 2011/0187083 A1    Aug. 4, 2011

Related U.S. Application Data

(60) Provisional application No. 61/100,858, filed on Sep. 29, 2008.

(30) Foreign Application Priority Data

Sep. 29, 2008  (DK) ................................ 2008 01356

(51) Int. Cl.
*B62D 21/14* (2006.01)

(52) U.S. Cl. .......................... 280/638; 280/656; 280/404

(58) Field of Classification Search ................. 280/656, 280/786, 789, 765.1, 766.1, 404, 400, 401, 280/407.1, 107, 482, 491.1, 491.2
See application file for complete search history.

(56) References Cited

U.S. PATENT DOCUMENTS 2,727,758 A    12/1955   Smith
(Continued)

FOREIGN PATENT DOCUMENTS

DE    2 328 276    12/1974
(Continued)

OTHER PUBLICATIONS

Yolaine Cussac; International Preliminary Report on Patentability issued in priority International Application No. PCT/EP2009/062304; Mar. 29, 2011; 7 pages; European Patent Office.

(Continued)

*Primary Examiner* — John Walters
*Assistant Examiner* — Brian Swenson
(74) *Attorney, Agent, or Firm* — Wood, Herron & Evans, LLP

(57) ABSTRACT

A telescopic vehicle for road transport of at least one long object, comprising: a rear vehicle portion being supported by at least one pair of wheels, the rear vehicle portion having a rear support structure for supporting the long object; and a front vehicle portion being telescopically connected to the rear vehicle portion to enable adjustment of a total length of the vehicle, the front vehicle portion having a front support structure for supporting the long object. At least one of the rear support structure and the front support structure is configured to allow relative movement between the long object and the respective vehicle portion, when the total length of the vehicle is adjusted.

25 Claims, 6 Drawing Sheets

U.S. PATENT DOCUMENTS

| | | | |
|---|---|---|---|
| 3,160,289 A | | 12/1964 | Leefer |
| 4,464,092 A | * | 8/1984 | Chambers et al. ............ 414/534 |
| 4,561,671 A | * | 12/1985 | DeWitt et al. ................. 280/404 |
| 5,017,081 A | * | 5/1991 | Helton .......................... 414/470 |
| 5,658,000 A | * | 8/1997 | Boudreaux ............... 280/149.2 |
| 6,612,601 B1 | | 9/2003 | Granlind |
| 6,808,191 B1 | | 10/2004 | Buhl et al. |
| 7,677,625 B2 | * | 3/2010 | Gosselin et al. ........... 296/26.09 |
| 7,744,318 B2 | * | 6/2010 | Wobben ............................. 410/45 |
| 7,918,633 B2 | | 4/2011 | Llorente Gonzalez |
| 2005/0031431 A1 | | 2/2005 | Wobben |
| 2005/0220558 A1 | | 10/2005 | Heuvel et al. |
| 2006/0113449 A1 | | 6/2006 | Nies |
| 2006/0144741 A1 | | 7/2006 | Wobben |
| 2006/0251517 A1 | | 11/2006 | Grabau |
| 2006/0285937 A1 | | 12/2006 | Wobben |
| 2007/0177954 A1 | * | 8/2007 | Kootstra et al. ................. 410/44 |
| 2007/0189895 A1 | | 8/2007 | Kootstra et al. |
| 2007/0224009 A1 | * | 9/2007 | Wehrli et al. .................... 410/44 |
| 2007/0248431 A1 | * | 10/2007 | Jensen ............................. 410/45 |
| 2007/0253829 A1 | | 11/2007 | Wessel et al. |
| 2008/0246241 A1 | | 10/2008 | Mollhagen |
| 2009/0274529 A1 | | 11/2009 | Broderick et al. |
| 2010/0168960 A1 | | 7/2010 | Pederson |
| 2010/0236161 A1 | | 9/2010 | Livingston et al. |
| 2010/0252977 A1 | | 10/2010 | Jorgensen et al. |
| 2010/0275695 A1 | | 11/2010 | Cotrell et al. |
| 2010/0310379 A1 | | 12/2010 | Livingston |
| 2011/0031292 A1 | | 2/2011 | Krogh et al. |

FOREIGN PATENT DOCUMENTS

| | | |
|---|---|---|
| DE | 100 45 169 | 4/2002 |
| EP | 1659026 A1 | 5/2006 |
| JP | 2004243805 A | 9/2004 |
| NL | 9400578 | 11/1995 |
| WO | 9917989 A1 | 4/1999 |
| WO | 2006000230 A1 | 1/2006 |

OTHER PUBLICATIONS

Andras Szaip; International Search Report issued in priority International Application No. PCT/EP2009/062304; Feb. 1, 2010; 3 pages; European Patent Office.

Andras Szaip; Written Opinion issued in priority International Application No. PCT/EP2009/062304; Feb. 1, 2010; 5 pages; European Patent Office.

Author Unknown, Article entitled "Gipfelsturmer," Nov. 2005, pp. 22-24, Kran- & Schwertansportmagazin.

Hans Winkelmeier, Article entitled "Tauernwindpark Oberzeiring," p. 45, Feb. 2004, DEWI Magazin.

Author Unknown, Article entitled "International Cranes and Specialized Transport," p. 25, Feb. 2006. The Magazine for Equipment Users and Buyers.

* cited by examiner

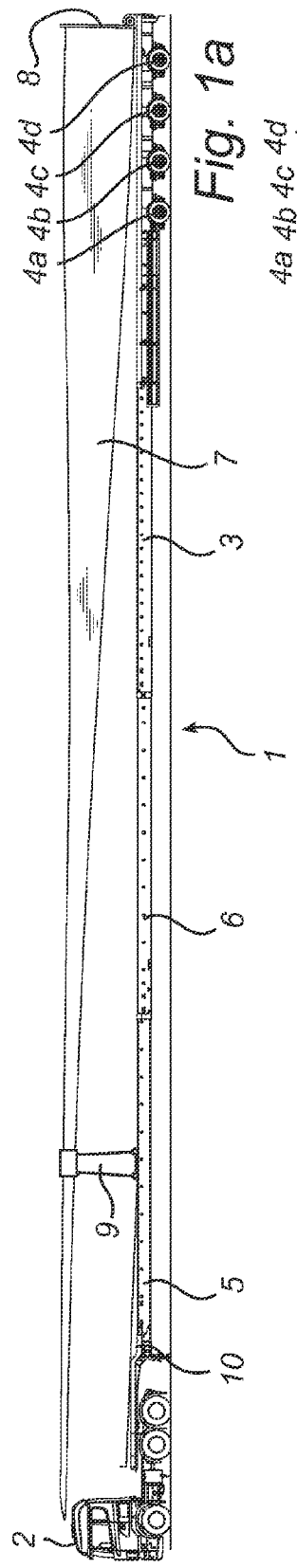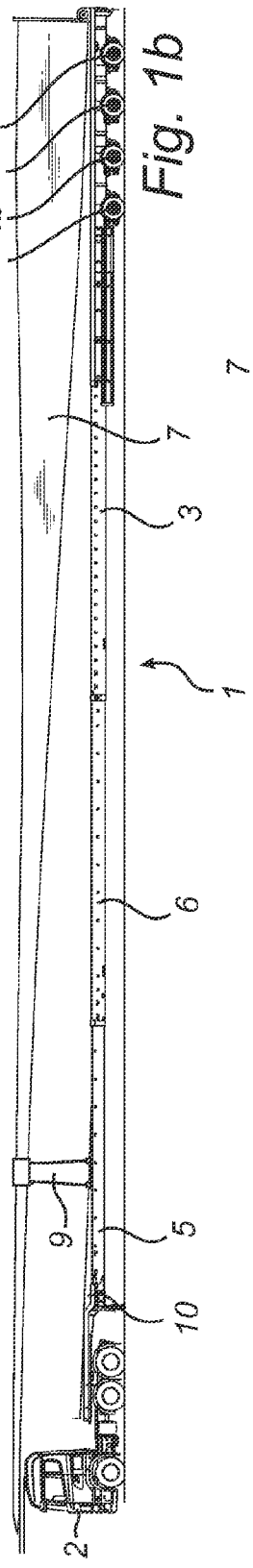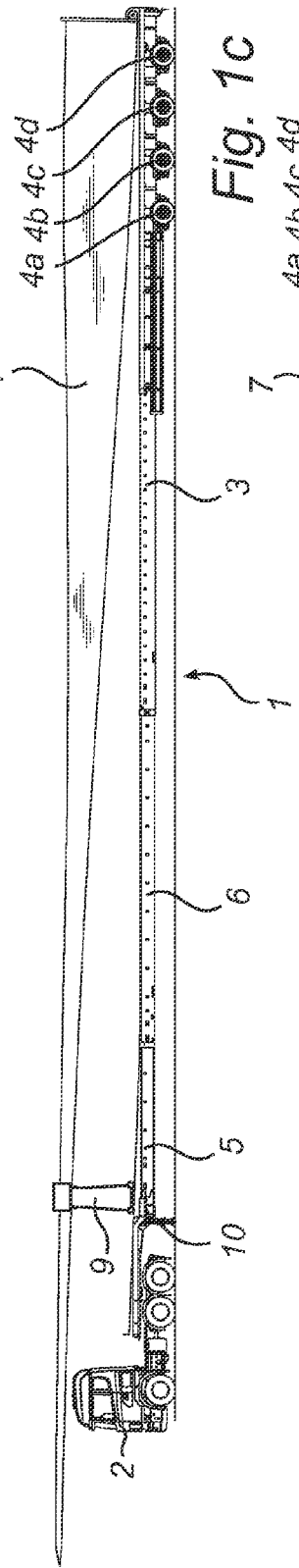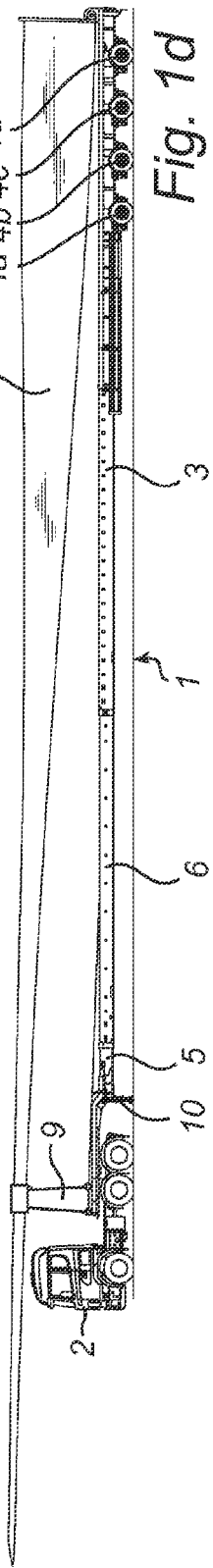

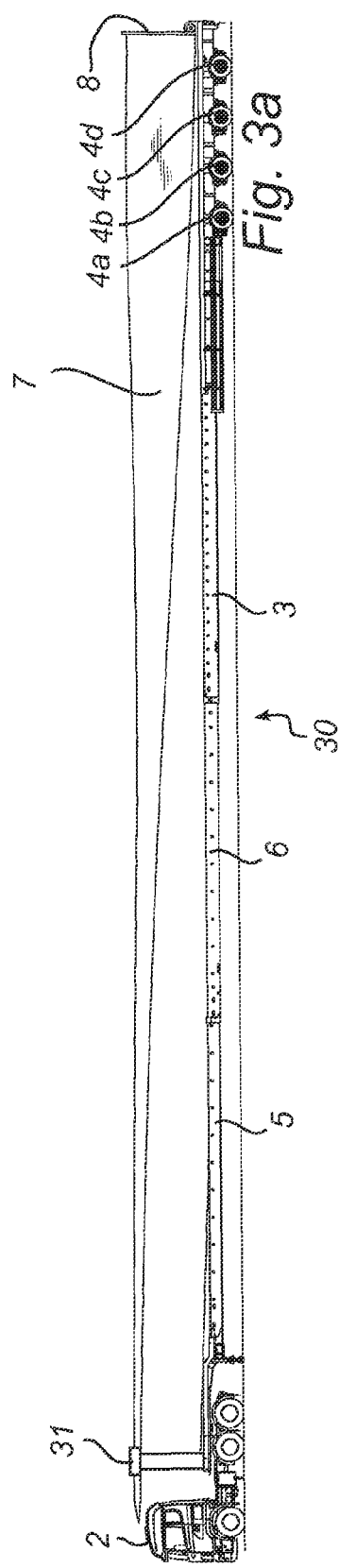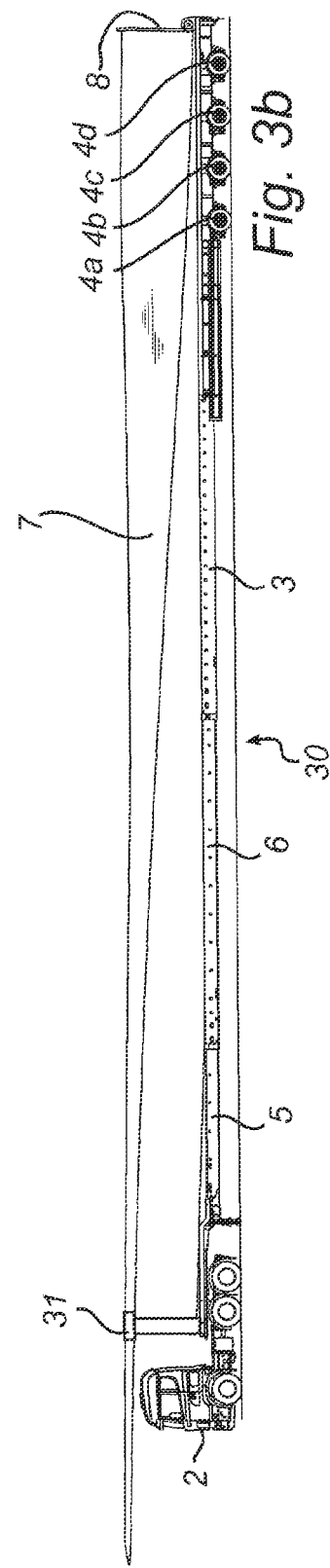

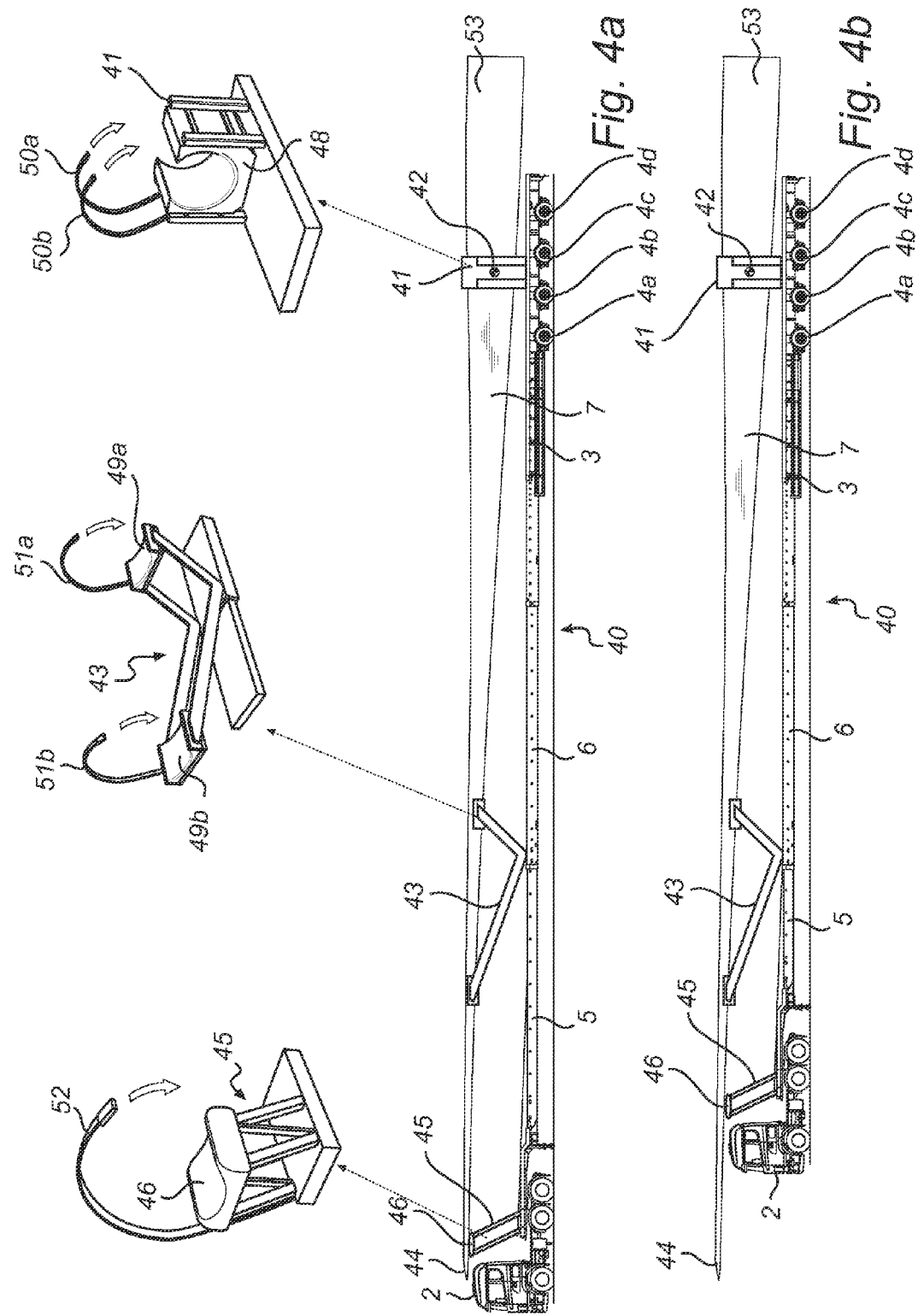

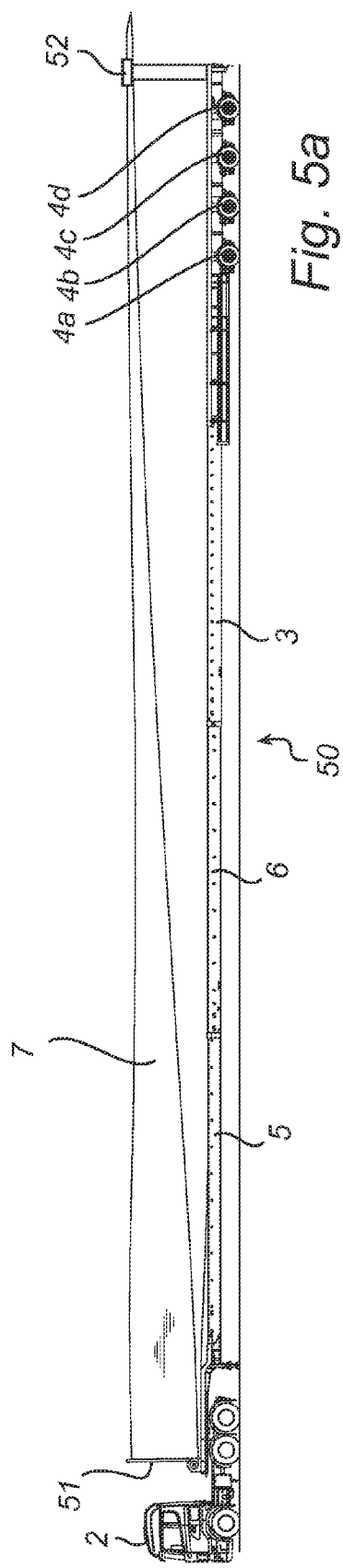
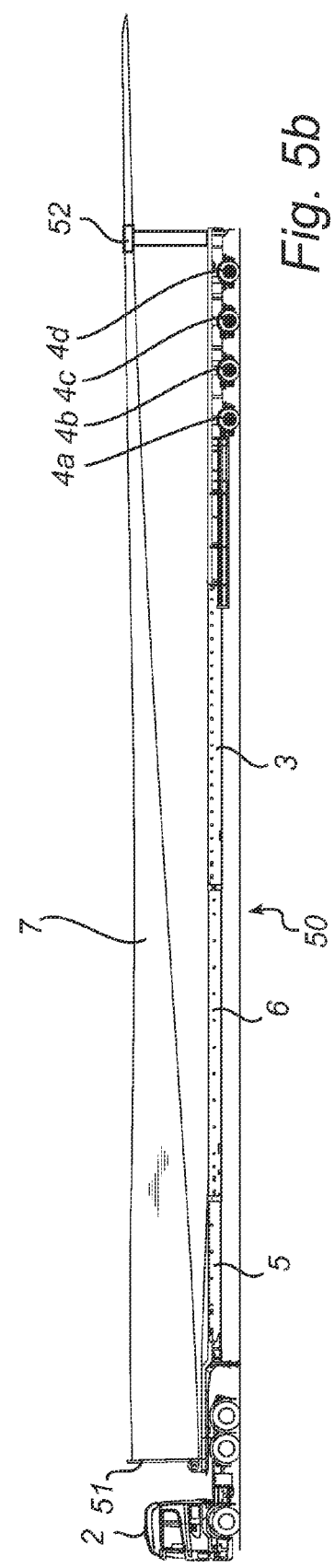

TELESCOPIC VEHICLE AND METHOD FOR TRANSPORTING A LONG OBJECT

TECHNICAL FIELD OF THE INVENTION

The present invention relates to a telescopic vehicle for the transportation of a long object, in particular a wind turbine blade. The present invention further relates to a method for transporting a long object using such a telescopic vehicle.

TECHNICAL BACKGROUND

When transporting a very long object, such as a blade of a modern wind turbine, the long object is generally attached to a trailer which is connected to a truck to form a trailer-truck assembly.

Due to the length of the object to be transported, it must typically be ensured that the road from the factory to the destination, which may be a wind turbine installation site, does not include any turns that are too sharp for the trailer-truck assembly to handle.

In practice therefore, very careful planning of the route to be taken by the trailer-truck assembly carrying the long object to be transported is required.

For very long objects, it may even be practically impossible to move the long object from the factory to the destination with currently available vehicles without modifying the roads along the route.

Obviously, modifying the roads will take time and be costly.

SUMMARY OF THE INVENTION

In view of the above-mentioned and other drawbacks of the prior art, a general object of the present invention is to provide an improved vehicle for transportation of very long objects, and in particular to provide a vehicle that enables transportation of very long objects, thereby facilitating selection of a transportation route.

According to a first aspect of the present invention, these and other objects are achieved through a telescopic vehicle for road transport of at least one long object, comprising: a rear vehicle portion being supported by at least one pair of wheels, the rear vehicle portion having a rear support structure for supporting the long object; and a front vehicle portion being telescopically connected to the rear vehicle portion to enable adjustment of a total length of the vehicle, the front vehicle portion having a front support structure for supporting the long object, wherein at least one of the rear support structure and the front support structure is configured to allow relative movement between the long object and the respective vehicle portion, when the total length of the vehicle is adjusted.

The "support structure" is a structure configured to at least prevent the long object from "falling off" the vehicle when being transported thereby.

The telescopic vehicle according to the various embodiments of the present invention may include a propulsion source, or may be configured to be connected to a propulsion source. Accordingly, the telescopic vehicle may, for example, be a telescopic truck or a telescopic trailer configured to be pulled by a tractor (trailer truck).

It should, in this context, be noted that the telescopic vehicle according to the various aspects of the present invention is particularly suitable for the transportation of one or several oblong object(s) being at least 40 meters long.

The present invention is based upon the realization that the planning of a transportation route for road transportation of a long object, such as a wind turbine blade, can be greatly facilitated by enabling adjustment of the wheelbase of the vehicle carrying the long object while the vehicle is in transit. By enabling adjustment of the wheelbase, sharper turns in the road can be negotiated, which increases the number of available routes to take from a starting location to a final destination.

The present inventor has further realized that such an adjustment of the wheelbase can be achieved while in transit by providing the telescopic vehicle with a front support structure provided on the front vehicle portion and a rear support structure provided on the rear vehicle portion and configuring at least one of these support structures to allow relative movement between the long object and its respective vehicle portion.

Hereby, the desired length adjustment of the vehicle, and hence adjustment of the wheelbase, can be performed efficiently, without the need for releasing and unloading the long object.

Accordingly, transportation time can be saved, and the inconvenience caused to other motorists can be minimized.

Considering the example when the long object is a wind turbine blade being transported from the factory to the installation site, the vehicle can travel in its full length, which is typically determined by the length of the blade and possibly the maximum allowable extension of the blade outside the boundaries of the vehicle, except when passing difficult portions of the transportation route, such as sharp turns or roundabouts. When coming to, for example, a roundabout, the driver can, using the vehicle according to embodiments of the present invention, enter the roundabout, temporarily shorten the vehicle with accompanying relative motion between the vehicle and the blade, pass the roundabout, lengthen the vehicle to its transportation length, and then continue to drive.

This allows for the transportation of longer wind turbine blades, which ultimately enables more efficient generation of wind power.

According to one embodiment of the present invention, at least one of the rear support structure and the front support structure may be movably arranged on its respective vehicle portion, to thereby enable maintaining a substantially constant distance between the first and second supports, while allowing relative movement between the long object and the respective vehicle portion.

Hereby, it can be ensured that the relatively delicate surface of a wind turbine blade is not damaged during transportation, at least not by the support structure(s) during length adjustment of the vehicle.

The movable support structure may advantageously be displaceably arranged on its associated vehicle portion.

Furthermore, the telescopic vehicle may further comprise a track extending along at least a portion of the vehicle portion, the moveable support structure being displaceably arranged on the track for defining the displacement of the support structure resulting from adjustment of the total length of the vehicle.

Such a track may, for example, be arranged to provide a smooth transition of the displaceably arranged support structure along the track.

In the exemplary case when the telescopic vehicle is a telescopic trailer, there may typically exist more or less sharp steps along the trailer bed, for example to provide for flexible connection between the trailer and a tractor (trailer truck). In such a case, the track may be configured to provide for a continuous and smooth displacement of the displaceable support structure.

As will be appreciated by the person skilled in the relevant art, there are several ways of achieving the desired displaceability of the support structure, such as providing the support structure with wheels that run on a track, providing the support structure on a belt that travels along the track etc.

According to another embodiment of the telescopic vehicle according to the present invention, at least one of the rear support structure and the front support structure may be configured to allow the long object to be displaced relative thereto when the total length of the vehicle is adjusted.

Advantageously, at least one of the rear support structure and the front support structure may comprise a roller arranged to be in contact with the long object so as to reduce friction between the support structure and the long object upon relative movement therebetween.

The support structure may comprise more than one roller, and the roller(s) may be of any suitable shape, such as cylindrical or spherical etc.

By providing the roller(s), the support structure(s) can support and hold the long object, while minimizing the risk of damaging the surface of the long object.

As an alternative to providing the support structure with one or several rollers, the long object may be allowed to slide on a low-friction element, which may advantageously be resilient.

To provide the desired telescopic functionality, the telescopic vehicle according to the present invention may further comprise an actuator mechanically connected to the front and rear vehicle portions, and controllable to adjust the length of the vehicle. The actuator may connect the front and rear vehicle portions either directly or via one or several intermediate vehicle portions.

By providing such an actuator, the length adjustment of the vehicle can be made less time-consuming than is the case in conventional telescopic vehicles in which the length adjustment is typically achieved by, for example, locking the rear wheels and backing up with the tractor to reduce the length of a telescopic trailer. This procedure would be far too time-consuming to use several times during road transportation of a long object, such as a wind turbine blade.

The actuator may advantageously comprise hydraulic means, such as at least one hydraulic cylinder, whereby the length of the telescopic vehicle can be adjusted rapidly and precisely.

Alternatively, the actuator may comprise a pinion arrangement powered by an electric motor.

As is evident to the skilled person, several other actuator arrangements may be feasible, such as wire arrangements, chain arrangements etc.

According to a preferred embodiment, the telescopic vehicle may be a telescopic trailer, and the front vehicle portion may be connectable to a tractor.

The telescopic trailer may advantageously be configured to enable the long object to extend forward above the tractor when the telescopic vehicle is contracted. Hereby, no other vehicle can accidentally run into the long object, and the risk of injury can thus be reduced. Furthermore, the overhang can be minimized, since the length of the tractor-trailer arrangement is utilized efficiently.

According to a second aspect of the present invention, the above-mentioned and other objects are achieved through a method of transporting at least one long object, comprising the steps of: providing a telescopic vehicle according to any one of the preceding embodiments, having the long object arranged thereon; and temporarily reducing the length of the telescopic vehicle to enable the vehicle to pass an otherwise impassable route portion.

For embodiments in which the long object is a wind turbine blade, it may be advantageous to arrange the wind turbine blade with its tip facing backwards relative to the direction of transportation. Such an arrangement may give improved road handling properties, which may improve safety and allow a higher transportation speed, which allows for a reduced time of transportation.

Further variations and effects of the present aspect are largely analogous to those described above in connection with the first aspect of the invention.

BRIEF DESCRIPTION OF THE DRAWINGS

These and other aspects of the present invention will now be described in more detail, with reference to the appended drawings showing a currently preferred embodiment of the invention, wherein:

FIGS. 1a-d are schematic illustrations of a telescopic vehicle according to a first embodiment of the present invention in different states;

FIGS. 3a-b are schematic illustrations of a telescopic vehicle according to a second embodiment of the present invention in different states;

FIGS. 4a-b are schematic illustrations of a telescopic vehicle according to a third embodiment of the present invention in different states;

FIGS. 5a-b are schematic illustrations of a telescopic vehicle according to a fourth embodiment of the present invention in different states.

DETAILED DESCRIPTION OF A PREFERRED EMBODIMENT OF THE INVENTION

Figure 2:
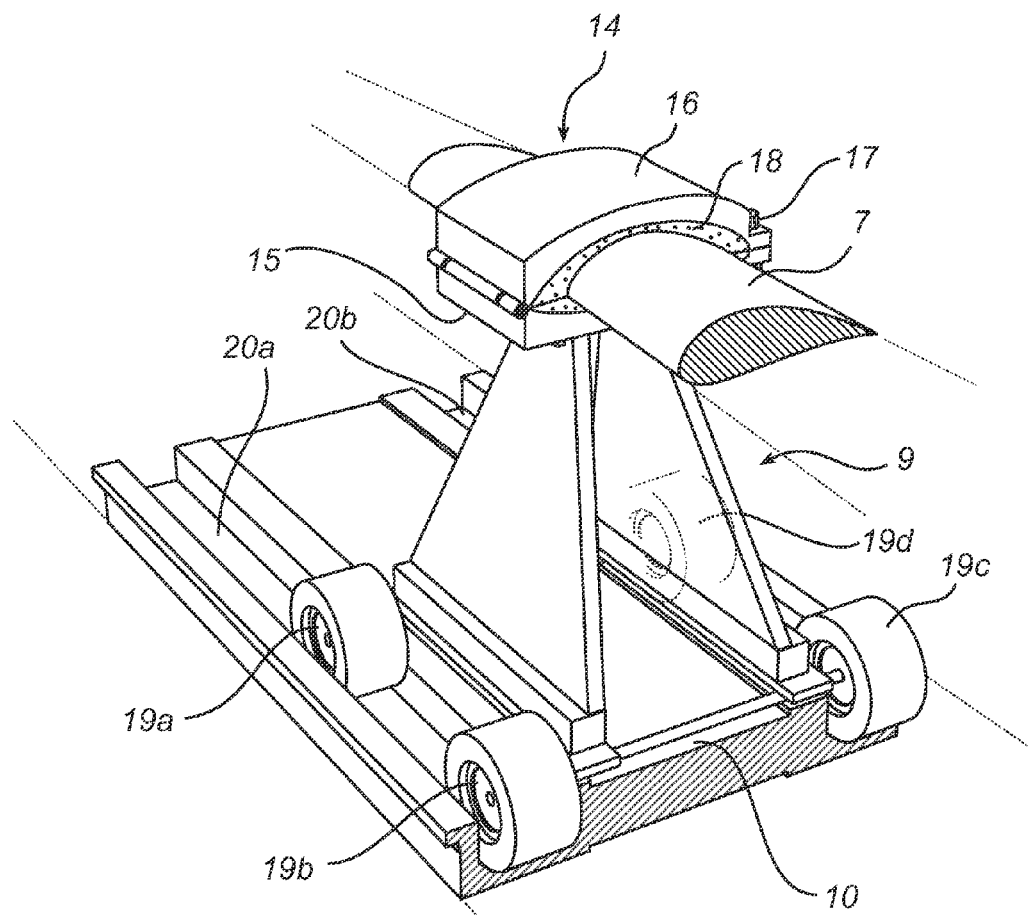
FIG. 2 schematically shows an embodiment of the front support structure comprised in the telescopic vehicle in FIGS. 1a-d.

In the following description, the present invention is mainly described with reference to a telescopic trailer being connected to a tractor, wherein the rear support structure is stationary relative to the rear vehicle portion when the length of the telescopic trailer is adjusted.

It should be noted that this by no means limits the scope of the present invention, which is equally applicable to other telescopic vehicles, in which the rear support structure may be movable, both support structures may be moveable, or both support structures may be fixed to their respective vehicle portions etc. In the latter case, at least one of the support structures should be configured to allow the long object to be displaced relative to the support structure(s) when the length of the telescopic vehicle is adjusted.

FIGS. 1a-d schematically illustrate a telescopic vehicle according to an embodiment of the present invention in different states.

In FIGS. 1a-d, a telescopic trailer 1 is shown connected to a tractor 2. The telescopic trailer 1 has a rear vehicle portion 3 being supported by four sets of wheels 4a-d, and a front vehicle portion 5 being supported by the tractor 2.

The rear 3 and front 5 vehicle portions are telescopically connected via an intermediate vehicle portion 6. In the presently illustrated example, the vehicle portions 3, 5, 6 are provided in the form of telescopically arranged booms.

In FIGS. 1a-d, the telescopic trailer 1 is shown carrying a long object in the form of a 54 meter long wind turbine blade 7. The blade 7 is supported by a rear support structure 8 arranged on the rear vehicle portion 3 and a front support structure 9 arranged on the front vehicle portion 5.

The front support structure 9 is displaceably arranged on a track 10 and slides, as is shown in FIGS. 1a-d, along the track 10 when the length of the telescopic trailer 1 is reduced.

As is schematically illustrated in FIGS. 1a-d, the rear support structure 8 is hinged to allow some angular movement, in a vertical plane, of the blade 7. Hereby, rotation of the blade 7 due to the telescopic action described above and/or movement during transportation can be handled.

It should be understood that the desired telescopic functionality can be provided in various alternative ways known to the skilled person, and that the vehicle portions accordingly can be provided as other structures than the above-referenced booms.

FIG. 2 is a close-up view of the front support structure 9 and its interaction with the blade 7, and with the track 10.

As can be seen in FIG. 2, the support structure 9 has an attachment portion 14 comprising a bottom part 15 and a top part 16. The blade 7 is held in place by pressing the bottom 15 and top 16 parts together, for example by one or several bolts 17. The attachment portion 14 further comprises a resilient member 18, which may be made of a compressible foam material or similar, arranged closest to the blade 7 to prevent damaging the surface of the blade 7 when clamping the blade 7 as shown in FIG. 2.

As can be seen in FIG. 2, the support structure 9 further has wheels 19a-d arranged at a bottom portion thereof. The wheels 19a-d are arranged to run in longitudinal recesses 20a-b provided in the track 10 to guide the support structure 9 and limit the sideways movement thereof.

With reference to FIGS. 3a-b, a second exemplary embodiment of the telescopic vehicle according to the present invention will now be described.

In FIG. 3a, a telescopic trailer 30 is shown in its extended, transportation state, with the wind turbine blade 7 being supported thereon by front 31 and rear 8 support structures. The telescopic trailer 30 in FIGS. 3a-b differs from that shown in FIGS. 1a-d in that the front support structure 31 (as well as the rear support structure 8) is fixed to the front trailer portion 5.

When the length of the telescopic trailer 30 is adjusted, the blade 7 thus slides on the front support 31.

To prevent damage to the surface of the blade 7, the front support 31 is adapted to keep the friction between the blade 7 and the front support 31 low. To that end, the front support 31 may, for example, be provided with rollers or a low-friction member arranged in contact with the blade 7.

Turning now to FIGS. 4a-b, a further embodiment of the telescopic vehicle according to the present invention is schematically shown in two different telescopic states.

In FIGS. 4a-b, the telescopic trailer 40 is provided with a first rear support structure 41 arrangeable to support the wind turbine blade 7 at a position substantially corresponding to the center-of-mass 42 thereof. To that end, the first rear support 41 may advantageously be moveably arranged and be configured to be fixed to the rear portion 3 of the trailer 40 at a selected location.

As can be seen in FIGS. 4a-b, the telescopic trailer 40 further comprises a second rear support structure 43 provided on the intermediate vehicle portion 6. It should be noted that, in the exemplary embodiment illustrated in FIGS. 4a-b, the intermediate vehicle portion 6 does not move relative to the rear vehicle portion 3 when the length of the vehicle 40 is adjusted. Accordingly, the second rear support structure 43 typically does not move relative to the blade 7 when the length of the vehicle 40 is adjusted.

To hold the wind turbine blade 7 in place without damaging the surface thereof, each of the first rear support structure 41 and the second rear support structure 43 is provided with a resilient member 48 and 49a-b, respectively, and at least one fastener 50a-b and 51a-b, respectively. The resilient members 48, 49a-b may, for example, be formed by a compressible foam material or the like, and the fasteners 50a-b and 51a-b may, for example, be provided in the form of one or several straps for strapping the blade 7 in place as is schematically indicated in FIGS. 4a-b.

To prevent excessive vertical movement of the tip 44 of the blade 7, the front support 45 comprised in the telescopic trailer 40 in FIGS. 4a-b is adjustable in height to compensate for the difference in distance between the tip 44 of the blade 7 and the top surface of the front vehicle portion 5 when the length of the telescopic trailer 40 is adjusted. In the exemplary embodiment illustrated in FIGS. 4a-b, the adjustment in height of the front support 45 is provided using a resilient support 46 which may, for example, be provided in the form of an inflatable "airbag". As is indicated in FIGS. 4a-b, the front support structure 45 may also be provided with one or several straps 52 for further limiting the movement of the blade 7 during transportation.

In the embodiment shown in FIGS. 4a-b, the wind turbine blade 7 is arranged in such a way that a portion of the blade, in this case, the base 53 of the blade 7 extends outside the trailer 40. This further decreases the wheelbase of the vehicle and helps to facilitate passing difficult portions of the route taken by the vehicle-blade arrangement.

It should be noted that any one of the other illustrated embodiments may equally well be configured to have the wind turbine blade 7 extend outside the vehicle during transportation.

Yet another embodiment of the telescopic vehicle according to the present invention will now be described with reference to FIGS. 5a-b. In the telescopic trailer 50 shown in FIGS. 5a-b the base end of the wind turbine blade 7 is attached to a front support structure 51 that is provided on the front trailer portion 5, and the tip end of the wind turbine blade 7 is supported by a rear support structure 52 that is provided on the rear trailer portion 3. When the trailer is contracted, the rear support structure 52 moves along the wind turbine blade 7. As was described above with reference to FIGS. 3a-b for the front support structure 31, the rear support structure in the present embodiment may advantageously be provided with rollers or a low-friction member arranged in contact with the wind turbine blade 7.

As can readily be understood by the skilled person, any one of the embodiments described above with reference to FIGS. 1a-d, 3a-b and 4a-b can be adapted to support the wind turbine blade 7 with its tip end pointing backwards relative to the direction of transportation of the telescopic vehicle.

Figure 6:
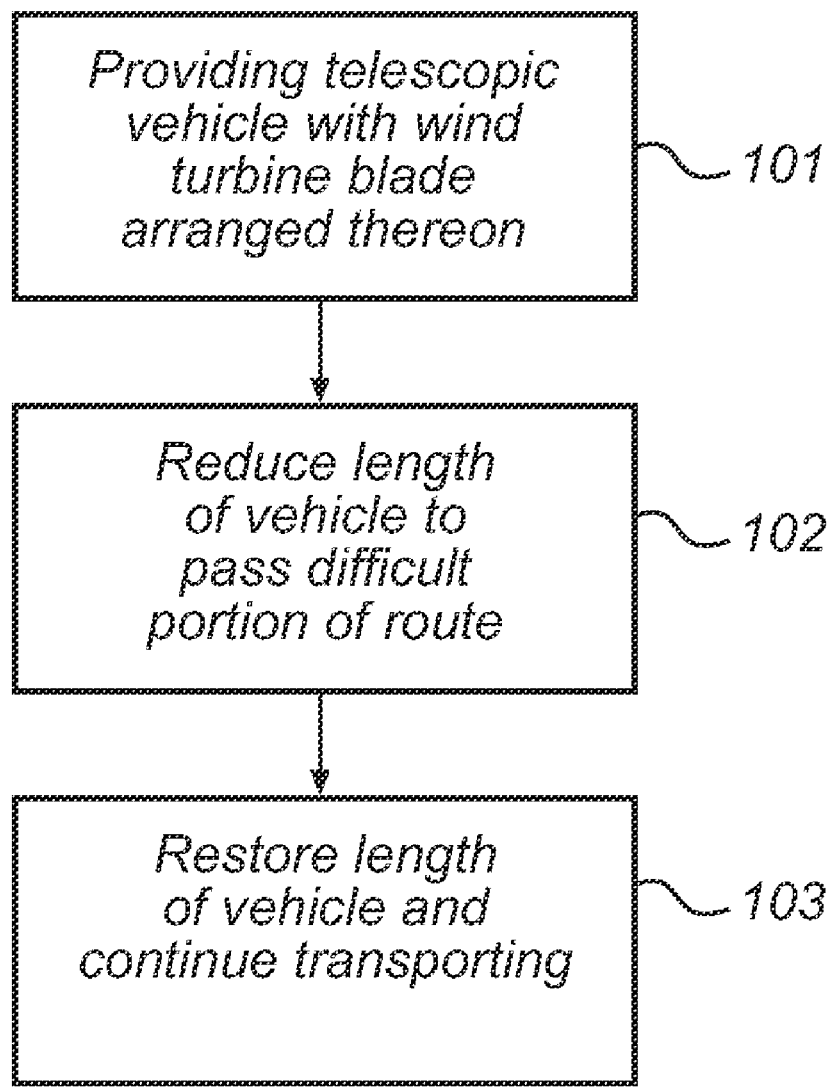
FIG. 6 is a flow-chart illustrating an embodiment of the method according to the present invention.

An embodiment of the method according to the present invention will now be described with reference to the flow-chart in FIG. 6.

In a first step 101, a telescopic vehicle, such as the various embodiments of the telescopic trailer described above, is provided, having a wind turbine blade 7 arranged thereon.

When actually transporting the wind turbine blade, the telescopic vehicle is generally, depending of course on the length of the wind turbine blade 7, in its extended state, and the total length of the trailer-tractor arrangement may be as long as over 56 meters for a blade being about 54 meters in length.

The transportation of such a long vehicle generally involves careful planning of the route, and the longer the vehicle is, in particular the longer the wheelbase of the vehicle is, the fewer the routes from a starting point to a destination point that are available.

Using the telescopic vehicle according to the various embodiments of the present invention, the route can, for example, be planned for a total vehicle length of 46 meters when transporting a considerably longer wind turbine blade 7, such as the 54 meter blade shown in the appended drawings.

Accordingly, when coming to a portion of the planned route, which is passable with a 46 meter long vehicle, but not with a 56 meter long vehicle, the driver, in step 102, reduces the length of the telescopic vehicle to allow safe passage of the particular portion of the route. Such a portion of the route may typically be a roundabout or a turn in the road.

To limit the disturbance experienced by other motorists, the contraction of the telescopic vehicle may be relatively fast, and preferably take place through remote control from the cabin of the tractor 2.

After having passed the difficult portion of the route, the driver then, in step 103 again restores the length of the vehicle to the transportation state, and continues the transportation of the wind turbine blade 7 towards the final destination.

The person skilled in the art realizes that the present invention by no means is limited to the preferred embodiments described above. For example, the rear support may be arranged to move when the length of the vehicle is adjusted, and/or the rear support may allow the long object to move relative thereto when the length of the vehicle is adjusted. Furthermore, the wind turbine blade may be arranged on the telescopic vehicle with its tip pointing backwards in relation to the direction of transportation. Moreover, although the various embodiments of the telescopic vehicle described in the above detailed description have been telescopic trailers, the skilled person will understand that the telescopic vehicle according to various embodiments of the invention may equally well be self-propelled.

Additionally, in embodiments of the present invention where the long object moves backwards relative to the rear support structure when the length of the telescopic vehicle is reduced, it may be advantageous to provide a ballast load to the front vehicle portion to prevent tilting of the vehicle.

Moreover, additional support structures may be provided between the front support structure and the rear support structure to prevent or at least limit bending of the blade during transportation thereof.

The invention claimed is:

1. A telescopic vehicle for road transport of at least one long object, comprising:
   a rear vehicle portion being supported by at least one pair of wheels, the rear vehicle portion having a rear support structure for supporting the long object; and
   a front vehicle portion being telescopically connected to the rear vehicle portion to enable adjustment of a total length of the vehicle, the front vehicle portion having a front support structure for supporting the long object,
   wherein at least one of the rear support structure and the front support structure is configured to allow relative movement in a longitudinal direction of the telescopic vehicle between the long object and the respective vehicle portion such that the long object extends in the longitudinal direction of the telescopic vehicle beyond the at least one of the rear support structure and the front support structure when the total length of the vehicle is adjusted.

2. The telescopic vehicle according to claim 1, wherein at least one of the rear support structure and the front support structure is movably arranged on its respective vehicle portion, to thereby enable maintaining a substantially constant distance between the front and rear support structures, while allowing the relative movement between the long object and the respective vehicle portion.

3. The telescopic vehicle according to claim 2, wherein the movable support structure is displaceably arranged on its vehicle portion.

4. The telescopic vehicle according to claim 3, further comprising a track extending along at least a portion of the vehicle portion, the moveable support structure being displaceably arranged on the track for defining the displacement of the support structure resulting from adjustment of the total length of the vehicle.

5. The telescopic vehicle according to claim 4, wherein the track is configured to limit sideways movement of the moveable support structure.

6. The telescopic vehicle according to claim 1, wherein at least one of the rear support structure and the front support structure is configured to allow the long object to be displaced relative thereto when the total length of the vehicle is adjusted.

7. The telescopic vehicle according to claim 1, being a telescopic trailer, the front vehicle portion being connectable to a tractor.

8. The telescopic vehicle according to claim 7, being configured to enable the long object to extend forward above the tractor when the telescopic vehicle is contracted.

9. The telescopic vehicle according to claim 1, wherein each of the front and rear support structures is moveably arranged on its respective vehicle portion.

10. The telescopic vehicle according to claim 1, configured to transport a rotor blade for a wind turbine, the rotor blade having a tip and a base.

11. The telescopic vehicle according to claim 10, wherein the rotor blade is more than 45 meters long.

12. The telescopic vehicle according to claim 10, configured to transport the rotor blade with the tip pointing in a direction of transportation of the vehicle.

13. The telescopic vehicle of claim 1, wherein the at least one of the rear support structure and the front support structure is configured to support the long object in a vertical direction while allowing relative movement between the long object and at least one of the rear support structure and the front support structure in the longitudinal direction.

14. A telescopic vehicle for road transport of at least one long object, comprising:
   a rear vehicle portion being supported by at least one pair of wheels, the rear vehicle portion having a rear support structure for supporting the long object; and
   a front vehicle portion being telescopically connected to the rear vehicle portion to enable adjustment of a total length of the vehicle, the front vehicle portion having a front support structure for supporting the long object,
   wherein at least one of the rear support structure and the front support structure is configured to allow relative movement in a longitudinal direction of the telescopic vehicle between the long object and the respective vehicle portion when the total length of the vehicle is adjusted, and
   wherein at least one of the rear support structure and the front support structure is configured to allow the long object to pivot in a vertical plane about a rotational axis defined by the support.

15. A method of transporting at least one long object, comprising:
providing a telescopic vehicle having the long object arranged thereon, the telescopic vehicle having a rear vehicle portion telescopically connected to a front vehicle portion to enable adjustment of a length of the vehicle; and
with the long object loaded on the vehicle, temporarily reducing the length of the telescopic vehicle while allowing relative movement in a longitudinal direction of the telescopic vehicle between the long object and at least one of the front and rear vehicle portions to enable the vehicle to pass an otherwise unpassable route portion.

16. The method according to claim 15, wherein the long object is a rotor blade for a wind turbine, the rotor blade having a tip and a base.

17. The method according to claim 16, wherein the rotor blade is arranged with its tip pointing in a direction of transportation of the vehicle.

18. The method according to claim 16, wherein the rotor blade is arranged with its tip pointing away from a direction of transportation of the vehicle.

19. A method of transporting a wind turbine blade, comprising:
transporting the wind turbine blade on a telescopic vehicle, the telescopic vehicle having a rear vehicle portion with a rear support structure for supporting the long object, and a front vehicle portion having a front support structure for supporting the long object and being telescopically connected to the rear vehicle portion to enable adjustment of a total length of the vehicle;
reducing the length of the telescopic vehicle with the wind turbine blade loaded on the vehicle; and
transporting the wind turbine blade on the telescopic vehicle through a turn or curve with the vehicle in a reduced length.

20. The method according to claim 19, further comprising:
increasing the length of the telescopic vehicle with the wind turbine blade loaded on the vehicle; and
continuing to transport the wind turbine blade on the telescopic vehicle.

21. The method according to claim 19, further comprising maintaining a substantially constant distance between the first and second support structures as the length of the telescopic vehicle is adjusted.

22. The method according to claim 19, further comprising allowing relative movement in a longitudinal direction of the telescopic vehicle between the long object and the respective vehicle portion.

23. The method according to claim 22, further comprising:
fixedly attaching at least one of the first and second support structures to the wind turbine blade; and
moving the at least one of the first and second support structures relative to its respective vehicle portion as the length of the telescopic vehicle is adjusted.

24. The method according to claim 22, further comprising:
fixedly attaching at least one of the first and second support structures to its respective vehicle portion; and
moving the wind turbine blade relative to the at least one of the first and second support structures as the length of the telescopic vehicle is adjusted.

25. The method according to claim 22, further comprising pivoting the wind turbine blade in a vertical plane as the length of the telescopic vehicle is adjusted.

* * * * *